United States Patent
Mehta et al.

(10) Patent No.: US 9,160,765 B1
(45) Date of Patent: Oct. 13, 2015

(54) METHOD FOR SECURING ENDPOINTS FROM ONSLAUGHT OF NETWORK ATTACKS

(71) Applicant: Symantec Corporation, Mountain View, CA (US)

(72) Inventors: Shreyans Mehta, Mountain View, CA (US); Atif Mahadik, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 79 days.

(21) Appl. No.: 13/952,490

(22) Filed: Jul. 26, 2013

(51) Int. Cl.
*G06F 12/14* (2006.01)
*H04L 29/06* (2006.01)

(52) U.S. Cl.
CPC .................................. *H04L 63/145* (2013.01)

(58) Field of Classification Search
None
See application file for complete search history.

(56) References Cited

U.S. PATENT DOCUMENTS 8,296,846 B2 * 10/2012 Kay ................................ 726/22
8,839,417 B1 * 9/2014 Jordan ............................ 726/22

* cited by examiner

*Primary Examiner* — Brandon Hoffman
(74) *Attorney, Agent, or Firm* — Womble Carlyle Sandridge & Rice LLP

(57) ABSTRACT

A method for protecting endpoints from network attacks is provided. The method includes blocking a first data unit, in response to matching a portion of the first data unit to a specified exploit pattern, the matching occurring at a layer of a communication model below an application layer. The method includes collecting attributes of the first data unit at the application layer and blocking at least one further data, in response to the at least one further data unit matching at the application layer a subset of the collected attributes of the first data unit.

20 Claims, 4 Drawing Sheets

METHOD FOR SECURING ENDPOINTS FROM ONSLAUGHT OF NETWORK ATTACKS

BACKGROUND

Viruses, worms and other malicious software programs, collectively known as malware, are used by hackers to attack networks, in malicious attempts to gain access to computing devices and data. Malware arriving in network traffic can be blocked by monitoring layers 3 and 4 and looking for a match to a specified signature. In the Open Systems Interconnect (OSI) communication model, layers 1 (Physical Layer), 2 (Data Link Layer) and 3 (Network Layer) have protocols that specify how a network packet is moved from source to destination. Layers 4 (Transport Layer) and 7 (Application Layer) provide specifics of a request and identification of the application that created the packets. Layer 7 applications include File Transfer Protocol (FTP), Simple Mail Transfer Protocol (SMTP), Post Office Protocol (POP), Hypertext Transfer Protocol (HTTP) and Domain Name System Protocol (DNS). Layer 7 handles file transfers and display formatting. Generally, Internet Protocol (IP) security applies signature matching at the network layer and transport layer (layers 3 and 4), to block individual files. However, targeted or shotgun attacks that direct multiple and varied pieces of malware at network endpoints are difficult to defend against. As an example of a targeted or shotgun attack, a hacker could use a toolkit and try different malicious portable document format (PDF) files, with each PDF file targeting a different vulnerability in an Acrobat reader. Each file could potentially have a different universal resource locator (URL). The traditional approach of blocking all future connections seeking information from a source (e.g., blocking all connections to an Internet Protocol address or a Host) does not provide a desirable user experience, especially when these files are hosted on a compromised but otherwise legitimate website. In addition, blocking by URL alone is not sufficient because there could be multiple URLs hosting malware.

It is within this context that the embodiments arise.

SUMMARY

In some embodiments a method for protecting endpoints from network attacks is provided. The method includes blocking a first data unit, in response to matching a portion of the first data unit to a specified exploit pattern, the matching occurring at a layer of a communication model below an application layer. The method includes collecting attributes of the first data unit at the application layer and blocking at least one further data, in response to the at least one further data unit matching at the application layer a subset of the collected attributes of the first data unit.

In some embodiments, a tangible, non-transient, computer-readable media having instructions which, when executed by a processor, cause the processor to perform a method is provided. The method includes monitoring, on one of a network layer or a transport layer of a communication model, network traffic at a node and blocking data at the node, in response to matching at the one of the network layer or the transport layer a portion of the data to a specified signature, the data sent to the node from a network protocol address. The method includes gathering attributes of the blocked data at an application layer and determining a subset of attributes from the attributes of the blocked data, the subset of attributes including a characterization of the blocked data as malware. The method includes blocking further data at the node, sent from the network protocol address, which match one or more attributes in the subset of attributes at the application layer.

In some embodiments, a network detection component is provided. The network detection component includes a module having at least one processor, the module located on a node of a network. The module is configured to monitor, at the node, network traffic directed to an endpoint and determine whether data arriving at the node from a network protocol address matches, at one of a network layer or a transport layer, a specified exploit pattern. The module is configured to block the data at the node, as a result of the data matching the specified exploit pattern at the one of the network layer or the transport layer. The module is configured to derive, at an application layer, a set of attributes of the blocked data and to block further data at the node, as a result of the further data arriving at the node from the network protocol address and the further data matching, at the application layer, one or more attributes of the set of attributes.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
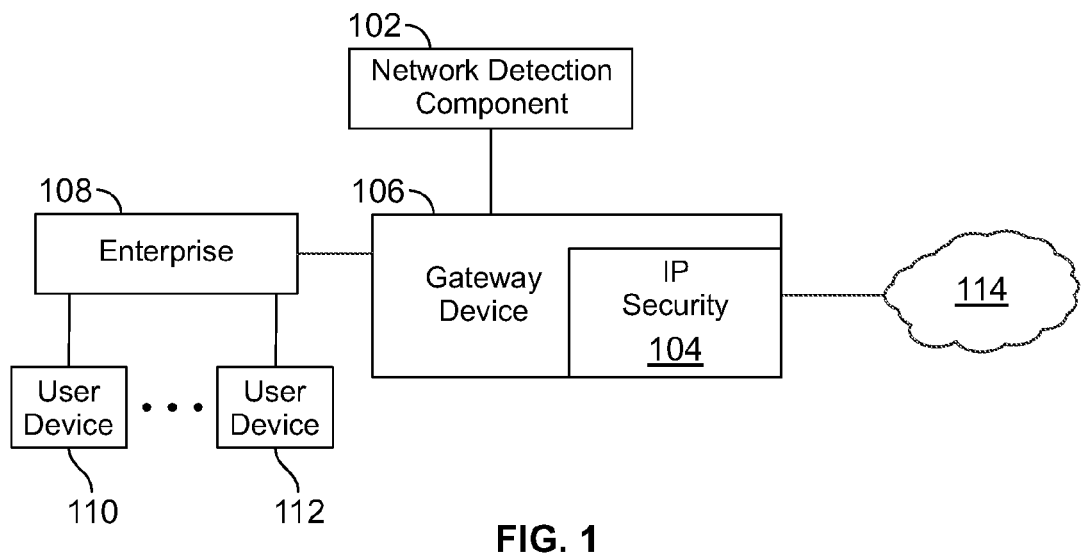
FIG. 1 is a schematic diagram of a network detection component coordinating with a gateway device, to protect user devices at an endpoint of a network in accordance with some embodiments.

A network detection component protects endpoints of a network from network attacks, by looking on the application layer at attributes of network traffic in some embodiments. The network detection component acts as a network security agent inline with an endpoint, e.g., at an intermediate node, or at an endpoint. The network detection component identifies and tracks properties of each attack being detected and all sessions and connections. Once the network detection component detects multiple attacks being carried out with the same network application layer attributes within a short span of time, the network detection component automatically blocks and drops connections from a remote host with similar attributes for a temporary time period. This automatic block may be instituted independent of administrator involvement.

The network detection component stores network application layer attributes, e.g., in a cache, for all attacks that have been detected and then compares these attributes against similar connections that occur later in time. If any of these values match, then the network detection component blocks the connection automatically. In some embodiments an attribute may be section of interest in a protocol or file or something derived from the section of interest in the protocol or file.

In some embodiments, the network detection component or a standard Internet Protocol (IP) security device or agent blocks a specific piece of data upon finding a match to a known malware signature. Then, the network detection component gathers application layer attributes of the blocked piece of data, and sorts or parses through these attributes to find suspicious attributes. A subset of suspicious application layer attributes of the blocked piece of data is formed. Pieces of data arriving from the same host, e.g., from the same IP address, as the blocked piece of data, and which match one or more of the suspicious application layer attributes of the blocked piece of data, are blocked by the network detection component for a period of time. In various embodiments, the network detection component can cooperate with or be integrated into a network appliance or an end user device.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the embodiment shown in FIG. 1, a network detection component 102 cooperates with a gateway device 106 to protect user devices 110, 112 operating in an enterprise 108. The gateway device 106 could be owned and operated by enterprise 108 as part of the enterprise 108, or could be engaged by the enterprise 108 as part of a service provider agreement and owned and operated by a service provider. The gateway device 106 and the network detection component 102 are shown as inline between the cloud environment 114, which could include various servers, and the user devices 110, 112.

An Internet Protocol security module 104 is integrated with the gateway device 106, and provides various security measures. The network detection component 102 coordinates with the gateway device 106 and the Internet Protocol security module 104, or could be integrated with one, the other, or both of these, in various embodiments. In case of another network protocol or other embodiments, the Internet Protocol security module 104 could be replaced by a network protocol security module conforming to the appropriate network protocol.

The network detection component 102 and the Internet Protocol security module 104 monitor network traffic arriving at the gateway device 106, i.e., arriving at the network node upon which the gateway device 106, the Internet Protocol security module 104, and the network detection component 102 are located. In various embodiments, the network detection component 102, the Internet Protocol security module 104, or the network detection component in cooperation with the Internet Protocol security module 104, is evaluating data traffic on the network layer and/or the transport layer for matches to malware signatures. When a data unit, arriving from a network protocol address, e.g., an IP address, matches a specified exploit pattern, e.g., a malware signature, the network detection component 102 and/or the Internet Protocol security module 104 blocks the data unit. In some embodiments, this could involve blocking a file, a data stream or other data unit that has the match, thereby preventing the file, data stream or other data unit from proceeding onward from the network node to whichever user device 110, 112 the data unit has as a destination. It should be appreciated that matching to the exploit pattern could be performed by matching a portion of a packet, at the network layer or transport layer, to the exploit pattern.

The network detection component 102 employs additional measures to protect endpoints from network attacks in some embodiments. In order to thwart network attacks that go beyond a single exploit, the network detection component 102 examines the blocked data unit and collects attributes of the data unit, at the application layer. Examples of types of application layer attributes, and their relevance to hacker attacks, are further discussed below.

The network detection component 102 monitors network traffic at a node of the application layer, and extracts application layer attributes of data units arriving at the node. If an arriving data unit has the same network protocol address as the blocked data unit, and matches at the application layer a subset of the collected attributes of the blocked data unit, the network detection component 102 blocks that arriving data unit. Thus, arriving data units that have suspicious attributes, as seen on the application layer, similar to the blocked data unit, are themselves blocked. The network detection component 102 blocks such data units based on the statistical likelihood that these data units could be part of a larger attack.

Traditionally, network security is based on blocking a file that has a portion which matches the signature of a previously seen piece of malware. Some hackers, and some attacks, rely on a single piece of malware, and traditional network security will reliably catch this once the signature of that malware is available. Some hackers, and some attacks, attempt to probe for weaknesses by trying one piece of malware, then a variation of it, then another, and so on, all targeting a particular endpoint, to try to break into that endpoint. The embodiments described herein for the network detection component 102 address and prevent these attacks.

One way to address and prevent attacks would be to block all traffic from a network address, once a single piece of malware has been spotted through matching of a signature.

However, this may excessively disrupt network services in a case where only a single piece of malware has been planted on a server of a service provider. In some embodiments the network detection component 102 selectively blocks the traffic from a network address which matches a subset of attributes of the initially blocked malware, and does so by looking for attributes on the application layer. In so doing, the network detection component 102 avoids excessively disrupting service from a service provider, because files or other data units that don't match selected application layer attributes of the blocked file or data unit are allowed through.

Figure 2:
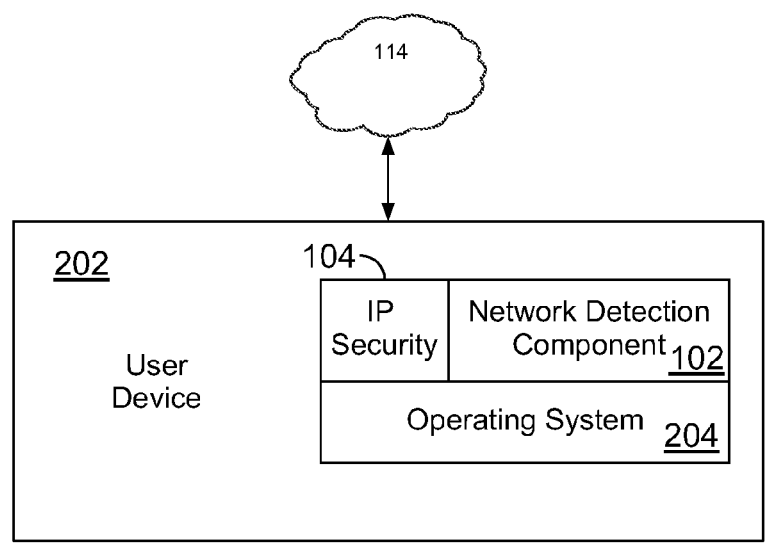
FIG. 2 is a schematic diagram of a network detection component protecting an endpoint, in a user device in accordance with some embodiments.

In the embodiment shown in FIG. 2, a network detection component 102 cooperates with an Internet Protocol security module 104 and an operating system (OS) 204 in a user device 202. The user device 202 is presumed to sit at an endpoint of a network, where the network is depicted as a cloud environment 114. The network detection component 102 and/or the Internet Protocol security module 104 monitor network traffic arriving at the user device 202. The network detection component 102 and/or the Internet Protocol security module 104 monitor traffic on the network layer or the transport layer, seeking to match specified malware signatures. If a portion of a file or a portion of a data stream matches a specified signature, the file or data stream is blocked at the node, i.e., prevented from final delivery to the user device 202.

The network detection component 102 gathers attributes of the blocked file or the blocked data stream at the application layer in some embodiments. The network detection component 102 may also determine a subset of the attributes of the blocked file or the data stream. This subset of attributes characterizes the blocked file or the blocked data stream as malware. The network detection component 102 then monitors files or data streams arriving at the user device 202. Any files or data streams which are sent from the same network protocol address as the blocked file or data stream, and which match one or more attributes in the subset of attributes characterizing the blocked file or blocked data stream as having malware, are blocked by the network detection component 102.

Figure 3:
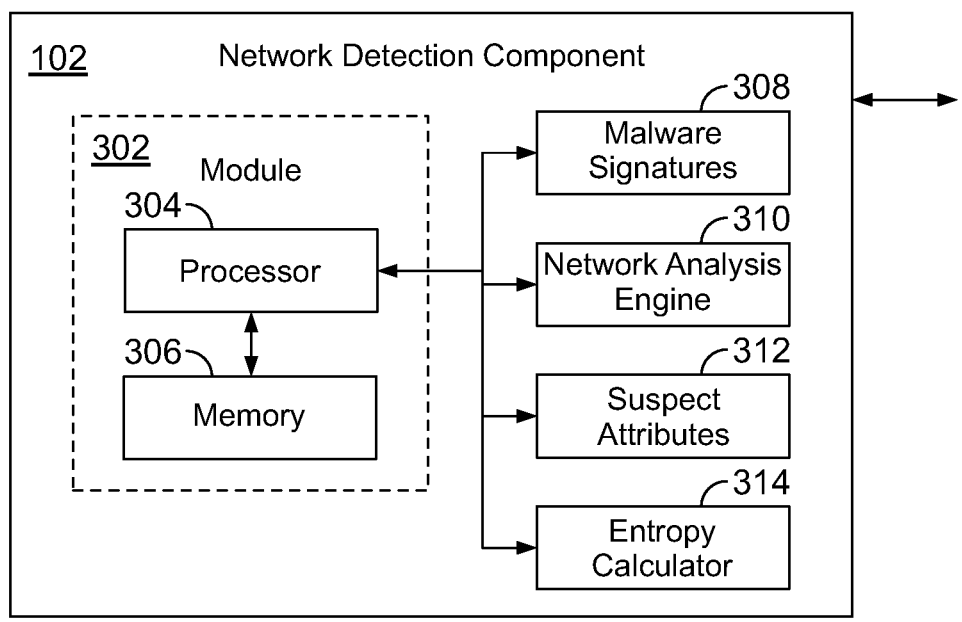
FIG. 3 is a schematic diagram of the internal sections of a network detection component in accordance with some embodiments.

FIG. 3 shows internal components of one embodiment of a network detection component 102. A module 302 includes a processor 304 and a memory 306. For example, the processor 304 could be a processor of a network appliance or a processor of a user device, and could be a dedicated processor or a shared processor. The memory 306 could be dedicated to the module 302 or could be shared with a network appliance or a user device. Sections and modules of the network detection component 102 could be implemented as software executing on the processor 304, or as hardware, firmware or combinations thereof, and could be distinct or integrated with one another, etc. The processor 304 communicates with the memory 306, malware signatures 308, a network analysis engine 310, suspect attributes 312, and an entropy calculator 314.

The malware signatures 308 could be implemented as a list of signatures in a memory, and the list could be downloadable for purposes of updating in some embodiments. Various formats for the signatures and the memory are readily devised. The network analysis engine 310 is implemented in accordance with one or more network protocols, and could be updatable as new protocols become available. The network analysis engine 310 performs a layer-by-layer peeling of a file from the application layer on downward. The module 302, in the network detection component 102, and the network analysis engine 310 cooperate to extract attributes of files at the application layer and compare the attributes of the files to the set of attributes derived from a blocked file.

The suspect attributes 312 could be implemented as a list of suspicious attributes in a memory, and this could be downloadable for purposes of updating in some embodiments. Various formats for the suspect attributes 312 and the memory are readily devised. Suspect attributes 312 could include various attributes having values or characteristics commonly or frequently seen as associated with the application layer in various types of malware, i.e., suspicious attributes. For example, the suspect attributes 312 could include presence of the evaluation (eval) function in a webpage, presence of a Java Archive file, or presence of Flash in a portable document format document. These and other attributes are further discussed below.

The network analysis engine 310 is configured to access the suspect attributes 312, and determine the set of attributes of the blocked file or data stream in accordance with the list of suspicious attributes. In one embodiment, for each attribute in the suspect attributes 312, the network analysis engine 310 gathers the value of that same attribute from the blocked file or the blocked data stream. The network analysis engine 310 includes functionality to determine whether the value of that attribute for the blocked file or data stream has the same characteristic as one of the suspicious attributes. If so, that attribute and corresponding attribute value for the blocked file or data stream is placed in the subset of attributes. The network analysis engine 310 searches for that attribute having the same value or characteristic as one of the suspicious attributes, in arriving files, data streams or other data units.

The entropy calculator 314 calculates a value associated with the entropy of a section of data. For example, the entropy calculator could apply a function to a piece of data to derive a value representing an entropy characteristic or attribute of the piece of data. Usage of such an entropy attribute is described next, along with other attributes, as relevant to malware and prevention of attacks.

It should be appreciated that malware takes many forms, and the techniques and strategies of hackers are many and varied. Below are descriptions of a few types of malware, along with a discussion of attributes seen at the application layer, and ways that the network detection component can use such attributes. To place malware and application layer attributes in context, the descriptions of malware are preceded by a brief review of aspects of the application layer.

Layer 7, also known as the application layer, has protocols that include hypertext terminal protocol (HTTP) and file transfer protocol (FTP). Payloads, i.e., files or data units that are sent to devices of end-users by hypertext terminal protocol and/or file transfer protocol include hyper text markup language (HTML) documents (e.g., webpages), executables (e.g., executable files), and portable document format (PDF) documents. Any of these could have malware hidden within. For a hypertext terminal protocol connection, attributes visible at the application layer include the host, the uniform resource identifier (URI), user agent, content type, etc.

One type of malware hides executable instructions in dynamically generated webpages with obfuscated JavaScript. That is, the executable JavaScript code is hidden (obfuscated) in webpages that are changed frequently, perhaps even by automatic generation. The code could be hidden in a mathematical expression. When the mathematical expression is evaluated, using the eval function, the executable code is produced. In this manner, the hacker hides malicious code which could ordinarily (i.e., prior to being hidden in an expression to be evaluated) be seen as a recognizable signature. Alternatively, executing the evaluation (eval) function on a large string of parameters could cause a stack to overflow, opening up a vulnerability. The hacker can change the strings of parameters frequently, to avoid further signature detection in subsequent attempts to get into a system. Thus, the presence of an eval function is an attribute to look for in a blocked file or data unit, once the file is blocked through use of an initial signature match. If an attack follows some time after the blocked file or data unit, the network detection component can block the attack by looking for the attribute of having the eval function in files or data units arriving from the same Internet Protocol address. It is worth noting that the eval function does have legitimate uses, such as for math operations. Simply blocking at all times all files or data units that have the eval function would disrupt network service unnecessarily as legitimate files would be blocked.

Calculating the entropy of a portion of a file or a data unit provides another attribute useful in spotting malware. An entropy function can be applied to data, to generate an entropy value which is then a characteristic or an attribute of that data. Generally, images will have an entropy attribute quite different from the apparently random data appearing in obfuscated code such as described above. Once a file is blocked through use of a signature match, calculating an entropy attribute of the file or data unit at the application layer provides an attribute to look for at the application layer. For example, the network detection component can look for other files or data units, arriving from the same Internet Protocol address as the blocked file or data unit, and which have an entropy attribute within a predefined range of the entropy attribute of the blocked file or data unit. It should be appreciated that simply blocking at all times all files or data units with an entropy attribute within a predefined range of a single specified entropy value would unnecessarily disrupt network service as legitimate files would be blocked.

Another type of malware hides executables in flash video in portable document format files. An executable could cause damage directly, or could download an executable file, even from another site. There are legitimate uses of flash video in portable document format files, such as for product demonstrations, animations or small movies. Simply blocking all portable document format files that have flash video would unnecessarily disrupt network service as legitimate files would be blocked. If a file or other data unit is blocked as a result of matching a malware signature at the network layer or transport layer, the network detection component can check to see whether the blocked file or data unit has the attribute of having a flash video in a portable document format file. If the blocked file or data unit has this attribute, the network detection component can then block further files or data units arriving from the same Internet Protocol address with flash video in portable document format files. In this manner, other files or data units without this attribute (i.e., which do not have flash video in portable document format files), but from the same Internet Protocol address, can proceed (unless blocked for matching another attribute of a blocked file).

Yet another type of malware hides executables in a Java Archive (JAR) file. There are legitimate uses for executables in Java Archive files, and blocking all such files would unnecessarily disrupt network service as legitimate files would be blocked. If a file or other data unit is blocked as a result of matching a malware signature at the network layer or transport layer, the network detection component can check to see whether the blocked file or data unit has the attribute of having a Java Archive file. If the blocked file or data unit has this attribute, the network detection component can then block further files or data units arriving from the same Internet protocol address when these files or data units are or have Java Archive files (which could be copies of the same Java Archive file, or differing Java Archive files, and so on). In this manner, only the suspicious files or data units are blocked, and other files or data units (unless blocked for matching another attribute of a blocked file) can proceed to their destination.

In the above scenarios, the blocking of further files or data units is performed for a predetermined period of time. In one embodiment, the period of time is extended if another malware signature is matched in another file or data unit arriving from the same Internet Protocol address. Limiting the span of time avoids false positives which could occur if the span of time were unlimited. In various embodiments, the predetermined period of time could be one or a few minutes, or half an hour, or an hour, or other length of time as appropriate with respect to observed durations of attacks. Some embodiments track multiple signature matches occurring during overlapping time periods, and block files or data units with respective attribute matches at the application layer. It should be appreciated that the embodiments are not limited to these specific types of malware and attributes as the above examples are provided for illustrative purposes and not meant to be limiting.

Figure 4:
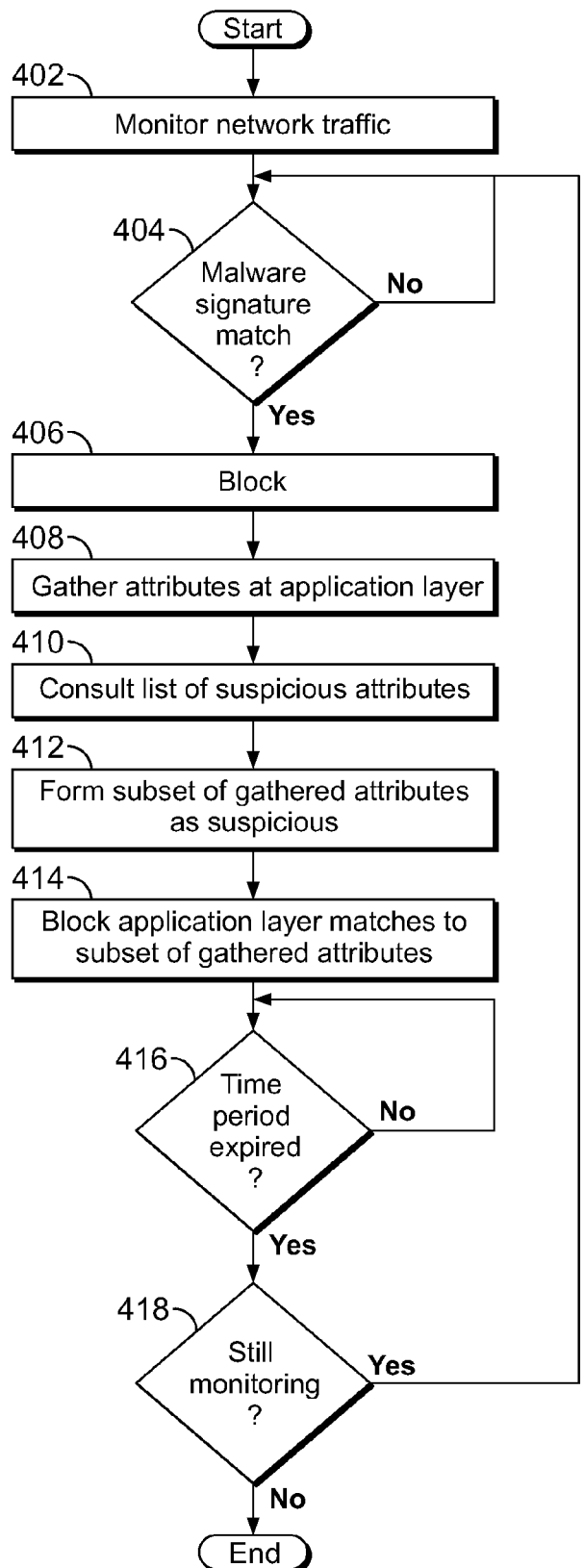
FIG. 4 is a flow diagram of a method for protecting endpoints, which can be practiced on or using the network detection component of FIGS. 1-3 in accordance with some embodiments.

FIG. 4 shows a flow diagram of a method for protecting endpoints in accordance with some embodiments. The method can be practiced by having a processor, such as a processor in the network detection component, or a processor in a server, a network appliance or a user device, execute one or more of the steps of the method. From a start point, network traffic is monitored in an action 402. For example, the network detection component can monitor network traffic, at the network layer and transport layer, at a node in the network. The node could be inline with an endpoint or at an endpoint of the network. In a decision action 404, the question is asked, is there a malware signature match? If the answer is no, there is no match, the flow branches and repeats the question in the decision action 404. If the answer is yes, there is a malware signature match, flow branches to the action 406.

In the action 406, the file or data unit that has the match to the malware signature is blocked. For example, the network detection component can block or quarantine the file or data unit, preventing the file or data unit from proceeding to the destination. Attributes are gathered at the application layer, in an action 408. For example, the network detection component can gather attributes of the blocked file or data unit by parsing the blocked file or data in some embodiments. In the action 410, a list of suspicious attributes is consulted. For example, the network detection component can look at the suspect attributes, which could include a list of attributes that are often suspicious in malware, as described with respect to FIG. 3.

In an action 412, a subset of the gathered attributes is formed as suspicious. For example, after the network detection component has gathered attributes of the blocked file or data unit and consulted the list of suspicious attributes, the network detection component can determine which of the gathered aspects of the blocked file or data unit are suspicious (i.e., have values or characteristics that make them suspicious), and keep those as a subset. This subset of gathered attributes, as seen on the application layer, is then available for comparison with application layer attributes of newly arriving files or data units.

In an action 414, application layer matches to the subset of gathered attributes are blocked or quarantined. For example, the network detection component can block newly arriving files or data units from the same Internet Protocol address as the blocked file or data unit and whose application layer attributes match (i.e., have the same value or characteristic as)

one or more in the subset of gathered attributes of the blocked file or data unit. In the decision action 416, the question is asked, has a time period expired? For example, a predetermined time period could be established during which the network detection component could block files as above, and the network detection component could cease blocking the files after the time period expired. If the answer is no, the time period has not expired, the flow branches back to the decision action 416 and the blocking continues. If the answer is yes, the time period has expired, the flow branches to the decision action 418.

In the decision action 418, the question is asked, is the monitoring still continuing? If the answer is yes, the monitoring continues and the flow branches back to the decision action 404, in order to search for more matches to malware signatures. If the answer is no, the monitoring is not continuing, then the flow branches to the endpoint. In further embodiments, various actions could be performed in different orders, signature matching could be ongoing and performed in parallel with blocking, multiple signatures could be matched and multiple blockings could be occurring in parallel, etc.

Figure 5:
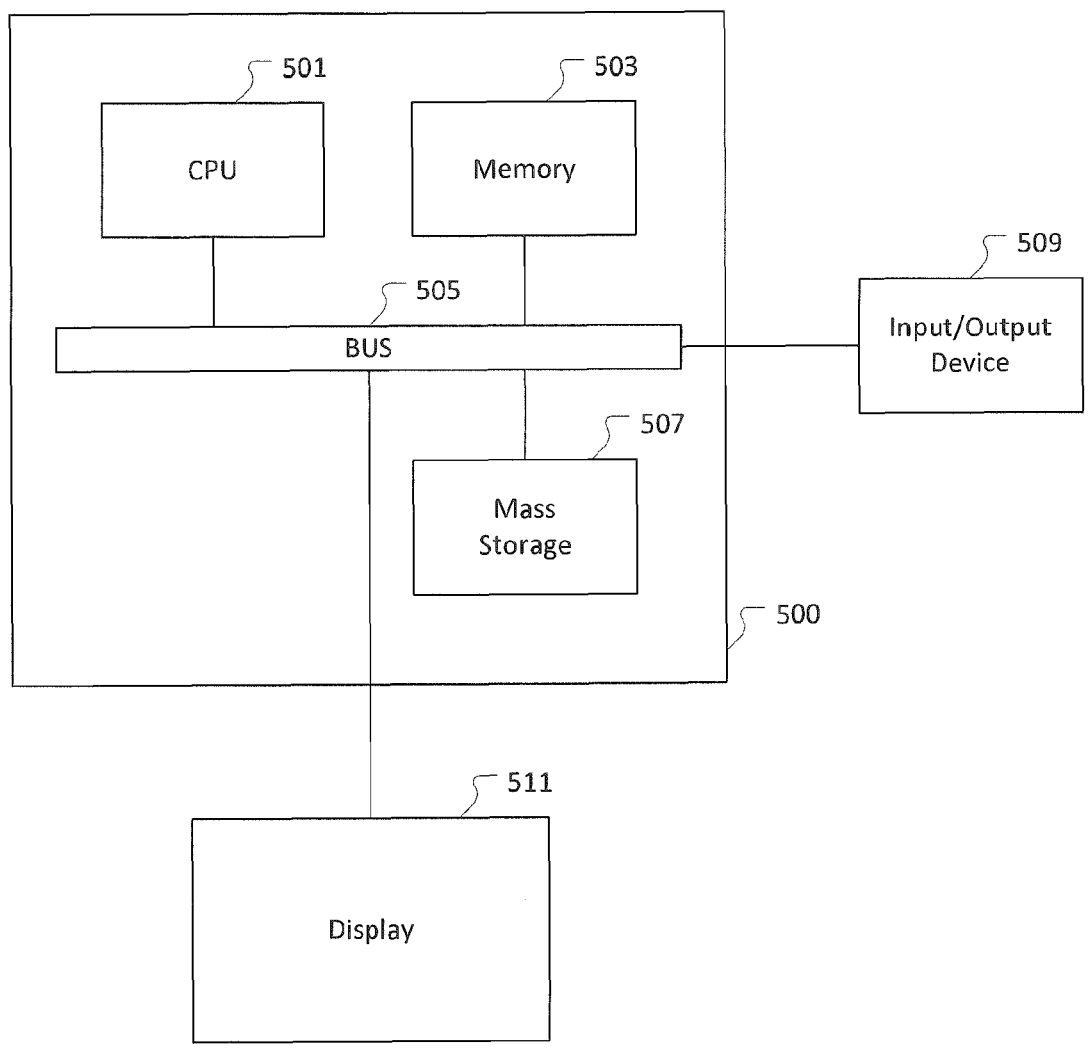
FIG. 5 is an illustration showing one example of a computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device 500 which may implement the embodiments described herein. The computing device 500 of FIG. 5 may be used to perform embodiments of the functionality for protecting endpoints in accordance with some embodiments. The computing device 500 includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein as described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing systems also. In addition, the embodiments may be integrated or implemented as part of a cloud computing environment where remote computer resources and/or services are provisioned over a network.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for protecting endpoints from network attacks, comprising:
    blocking a first data unit in response to matching a portion of the first data unit to a specified exploit pattern, the matching occurring at a layer of a communication model below an application layer;
    collecting attributes of the first data unit at the application layer, the attributes including one of: an entropy attribute of the first data unit, or a data attribute that the first data unit includes a data type that can have or hide executable data; and
    blocking at least one further data unit in response to the at least one further data unit matching at the application layer a subset of the collected attributes of the first data unit.

2. The method of claim 1, wherein matching the portion of the first data unit to the specified exploit pattern includes matching a portion of a packet of the first data unit to the specified exploit pattern.

3. The method of claim 1, wherein the specified exploit pattern includes a malware signature.

4. The method of claim 1, wherein matching the portion of the first data unit to the specified exploit pattern is performed at one of a network layer or a transport layer of the communication model.

5. The method of claim 1, wherein blocking the at least one further data unit is applied for a predetermined period of time.

6. The method of claim 1, wherein the first data unit includes a file or a portion of a data stream.

7. The method of claim 1, wherein blocking the at least one further data unit includes preventing the at least one further data unit from proceeding to a destination.

8. The method of claim 1, wherein the collected attributes include at least one from a set consisting of:
    whether the first data unit includes flash video embedded in a portable document format (PDF) file;
    whether the first data unit includes a Java Archive (JAR) file;
    whether the first data unit includes an evaluation (eval) function in a file; and
    an entropy characteristic of the first data unit or a portion thereof.

9. A tangible, non-transient, computer-readable media having instructions which, when executed by a processor, cause the processor to perform a method comprising:
    monitoring, on one of a network layer or a transport layer of a communication model, network traffic at a node;
    blocking data at the node, in response to matching at the one of the network layer or the transport layer a portion of the data to a specified signature, the data sent to the node from a network protocol address;
    gathering attributes of the blocked data at an application layer, wherein the attributes include an entropy attribute or presence of a data type that includes or is capable of hiding executable data;
    determining a subset of attributes from the attributes of the blocked data, the subset of attributes including a characterization of the blocked data as malware; and
    blocking further data at the node, sent from the network protocol address, which match one or more attributes in the subset of attributes at the application layer.

10. The computer-readable media of claim 9, wherein the node includes an endpoint or an intermediate node in a network.

11. The computer-readable media of claim 9, wherein blocking the further data includes:
    determining attributes of the further data; and
    determining whether the attributes of the further data match any attributes in the subset of attributes.

12. The computer-readable media of claim 9, wherein gathering the attributes and determining the subset of attributes includes:
    determining a set of attributes of the blocked data in accordance with a list of suspicious attributes; and
    selecting the subset of attributes from the set of attributes, at least one attribute of the subset of attributes having a same characteristic as one of the suspicious attributes.

13. The computer-readable media of claim 9, wherein:
    gathering the attributes of the blocked data includes applying a function to a portion of the blocked data to derive an entropy attribute of the blocked data; and
    blocking further data includes deriving corresponding entropy attributes of the further data and blocking those further data whose entropy attributes are within a specified range of the entropy attribute of the blocked data.

14. The computer-readable media of claim 9, wherein:
    gathering the attributes of the blocked data includes determining whether the blocked data includes a flash video embedded in a portable document format (PDF) file; and
    blocking further data includes blocking at least one further data in response to detecting flash video embedded in the at least one further data.

15. The computer-readable media of claim 9, wherein:
    gathering attributes of the blocked data includes determining whether the blocked data includes a Java Archive (JAR) file; and
    blocking further data includes blocking at least one further data in response to detecting a JAR file in the at least one further data.

16. The computer-readable media of claim 9, wherein:
    gathering attributes of the blocked data includes determining whether the blocked data includes an evaluation (eval) function in a file; and
    blocking further data includes blocking at least one further data in response to detecting an eval function in the at least one further data.

17. A network detection component, comprising:
    a module having at least one processor, the module located on a node of a network, the module configured to:
        monitor, at the node, network traffic directed to an endpoint;
        determine whether data arriving at the node from a network protocol address, matches, at one of a network layer or a transport layer, a specified exploit pattern;
        block the data at the node, as a result of the data matching the specified exploit pattern at the one of the network layer or the transport layer;
        derive, at an application layer, a set of attributes of the blocked data, the set of attributes including at least an entropy attribute or a data attribute of presence of a data type that is able to include or hide executable data; and
        block further data at the node, as a result of the further data arriving at the node from the network protocol address and the further data matching, at the application layer, one or more attributes of the set of attributes, including matching the entropy attribute or matching the data attribute.

18. The network detection component of claim 17, further comprising:
    a gateway network appliance, wherein the module is integrated into the gateway network appliance.

19. The network detection component of claim 17, further comprising:
  a network analysis engine configured to perform a layer-by-layer peeling of a file, wherein the module and the network analysis engine cooperate to extract attributes of files at the application layer and compare the attributes of the files to the set of attributes.

20. The network detection component of claim 17, further comprising:
  an entropy calculator configured to apply an entropy calculation function to the data, at the application layer, to derive an entropy value as an attribute in the set of attributes of the blocked data; and
  the entropy calculator further configured to apply the entropy calculation function to the further data at the application layer.

\* \* \* \* \*